United States Patent
Hong (10) Patent No.: US 7,913,054 B2
(45) Date of Patent: Mar. 22, 2011

(54) DIGITAL ELECTRONIC DEVICE CAPABLE OF MEMORY FORMATTING, A METHOD OF MEMORY FORMATTING, DIGITAL ELECTRONIC DEVICE HAVING A FUNCTION OF STORING AND METHOD FOR STORING THEREOF

(75) Inventor: Joo-sun Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 459 days.

(21) Appl. No.: 11/777,310

(22) Filed: Jul. 13, 2007

(65) Prior Publication Data

US 2008/0189505 A1 Aug. 7, 2008

(30) Foreign Application Priority Data

Feb. 1, 2007 (KR) .................. 10-2007-0010628

(51) Int. Cl.
*G06F 12/00* (2006.01)
(52) U.S. Cl. .......... 711/173; 711/E12.002; 711/E12.008
(58) Field of Classification Search .......... 711/170, 711/173, 112, 103, E12.002, E12.008
See application file for complete search history.

(56) References Cited

U.S. PATENT DOCUMENTS

| | | | | |
|---|---|---|---|---|
| 5,321,562 | A | * | 6/1994 | Hamada et al. ............... 360/48 |
| 2004/0233798 | A1 | | 11/2004 | Nakamura et al. |
| 2005/0138271 | A1 | | 6/2005 | Bernstein et al. |
| 2006/0059326 | A1 | | 3/2006 | Aasheim et al. |

FOREIGN PATENT DOCUMENTS

| | | |
|---|---|---|
| EP | 1 912 123 A1 | 4/2008 |
| JP | 10-83658 A | 3/1998 |
| WO | 2004/040577 A1 | 5/2004 |
| WO | 2004/040586 A1 | 5/2004 |
| WO | 2007/013372 A1 | 2/2007 |

* cited by examiner

*Primary Examiner* — Pierre-Michel Bataille
(74) *Attorney, Agent, or Firm* — Sughrue Mion, PLLC (57) ABSTRACT

A digital electronic device capable of memory formatting, a method for memory formatting, and a digital electronic device having a storing function and a storing method thereof are provided. The memory stores data, and the control unit formats the memory such that the memory includes a plurality of storage regions which store the data, a basic information region which stores basic information regarding the data, and a plurality of supplemental information regions which periodically store supplemental information updated according to the storing of the data.

28 Claims, 5 Drawing Sheets

| BASIC FAT | 1ST SUPPLEMENTAL FAT | 2ND SUPPLEMENTAL FAT | 3RD SUPPLEMENTAL FAT | | (N)TH SUPPLEMENTAL FAT |
|---|---|---|---|---|---|
| | 1ST STORAGE REGION | 2ND STORAGE REGION | 3RD STORAGE REGION | | (N)TH STORAGE REGION |

| BASIC FAT | 1ST SUPPLEMENTAL FAT | 2ND SUPPLEMENTAL FAT | 3RD SUPPLEMENTAL FAT | | (N)TH SUPPLEMENTAL FAT |
|---|---|---|---|---|---|
| | 1ST STORAGE REGION | 2ND STORAGE REGION | 3RD STORAGE REGION | | (N)TH STORAGE REGION |

FIG. 2B

| BASIC FAT | 1ST SUPPLEMENTAL FAT | 1ST STORAGE REGION | 2ND STORAGE REGION | | (N)TH STORAGE REGION |
|---|---|---|---|---|---|
| | 2ND SUPPLEMENTAL FAT | | | | |
| | : | | | | |
| | (N)TH SUPPLEMENTAL FAT | | | | |

DIGITAL ELECTRONIC DEVICE CAPABLE OF MEMORY FORMATTING, A METHOD OF MEMORY FORMATTING, DIGITAL ELECTRONIC DEVICE HAVING A FUNCTION OF STORING AND METHOD FOR STORING THEREOF

CROSS-REFERENCE TO RELATED APPLICATIONS

This application claims the benefit under 35 U.S.C. §119 of Korean Patent Application No. 10-2007-010628, filed on Feb. 1, 2007, in the Korean Intellectual Property Office, the entire disclosure of which is incorporated herein by reference.

BACKGROUND OF THE INVENTION

1. Field of the Invention

Devices and methods consistent with the present invention relate to a digital electronic device capable of memory formatting, a method of memory formatting, and a digital electronic device having a function of storing and a storing method thereof. More particularly, the present invention relates to a digital electronic device which is capable of extending lifespan of a memory and the device itself.

2. Description of the Related Art

A digital recording and reproducing device provides the function of writing digital transfer stream to a memory. A variety of recording modes may be used to record the transfer stream, such as a time shift mode, a reserved recording mode, or real-time broadcast recording mode.

In a conventional recording of transfer stream, a digital recording and reproducing device repeatedly updates, that is, writes the information of the transfer stream, including condition of IBP picture of each screen, span or volume of the contents, to the same addresses of file allocation table (FAT) which is used as the supplemental information region. This is in consideration of the fact that the information regarding the transfer stream varies as the transfer stream is stored to the memory repeatedly. As a result, the use of FAT is more frequent than use of data regions.

One of the limitations of the memory is that regions of the memory cannot be rewritten when these are written too many times. That is, the FAT may not be used, if data is written for more than predetermined times in the FAT.

For example, in the case of performing time shift recording, the data region of the memory stores 30-minute long broadcast, and the information regarding the stored data is updated every one minute in the FAT of the memory. Accordingly, the FAT is rewritten thirty times more often than the data region, and thus reaches the over-use state faster than the data region. As a result, normal storing of the data into the memory may not be possible due to overuse of the FAT, although the data region is still available for recording broadcast data.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a digital electronic device capable of memory formatting, which extends the life span of the memory and the device itself, by distributing the use of the most-frequently used supplemental information regions, a method of memory formatting, and a digital electronic device having a storing function and a storing method thereof.

The foregoing and other aspects are substantially realized by providing a digital electronic device capable of memory formatting, according to exemplary embodiments of the present invention, which comprises a memory which stores data, and a control unit which formats the memory such that the memory includes a plurality of storage regions which store the data, a basic information region which stores basic information regarding the data, and a plurality of supplemental information regions which periodically store supplemental information updated according to the storing of the data.

In the memory formatting, the control unit stores location information of the respective storage regions and location information of the supplemental information regions to the basic information region.

The control unit formats the memory such that one supplemental information region is allocated for each of the storage regions. The control unit causes the location information of the supplemental information regions allocated for the respective storage regions to be mapped with respect to the location information of the storage regions to which the supplemental information regions are allocated, and stored in the basic information region.

The memory comprises one of a Flash memory, and a Hard Disk Drive (HDD), and comprises at least one of a removable memory, and a built-in memory which are connected to the digital device having a recording function.

The foregoing and other aspects are substantially realized by providing a method for formatting a memory, according to exemplary embodiments of the present invention, which comprises allocating the memory into basic information region, at least one supplemental information region and at least one storage region; and storing basic information for accessing the supplemental information region and the data region in the basic information region.

Storing location information of the respective storage regions and location information of the respective supplemental information regions into the basic information region, may be further provided.

The allocating the memory comprises allocating one supplemental information region for each of the storage regions.

The storing comprises mapping location information of the supplemental information regions allocated to the respective storage regions with respect to location information of the storage regions to which the supplemental information regions are allocated, and storing the mapped data into the basic storage region.

The number of the supplemental information regions may or may not be identical to the number of the storage regions.

The foregoing and other aspects are substantially realized by providing a digital electronic device having a storing function, according to exemplary embodiments of the present invention, which comprises a memory comprising a plurality of storage regions which store data, a basic information region which stores basic information regarding the data, and a plurality of supplemental information regions which periodically store supplemental information as the supplemental information is updated according to the storing of the data, and a control unit which controls the memory such that the data provided by a signal source is stored to the storage regions in sequence, and the supplemental information region corresponding to the storage region to which the data is currently stored, is periodically updated with the supplemental information regarding the data being stored.

The control unit controls the memory such that, if a first storage region which currently stores the data does not have a residual space for further storing, the data is stored to a second storage region, which is the next storage region to store the data, and the last supplemental information stored in the supplemental information region corresponding to the first storage region, is stored to the supplemental information region which corresponds to the second storage region.

The control unit controls the memory such that the supplemental information region corresponding to the second storage region is updated with the supplemental information regarding the data being stored to the second storage region.

If the data provided by the signal source is a transfer stream, a separator which divides the transfer stream into audio and video data; and a decoder which decodes the divided video data, may be further provided. The control unit determines picture characteristic per frame of the decoded video data, and controls the memory to process the determined picture characteristic per frame such that the determined picture characteristic per frame is stored as the supplemental information.

The control unit determines the picture characteristic per frame of the decoded video data, and controls the memory such that the determined picture characteristic per frame is stored according to a preset period, to the supplemental information region which corresponds to the storage region to which the decoded video data is stored.

A signal receiving unit may be further provided, which receives a storage mode selection signal to store the data, and wherein the signal receiving unit receives the storage mode selection signal from at least one of a remote control system, a key input unit provided to a main body, and a mouse.

The foregoing and other aspects are substantially realized by providing a method for storing, according to exemplary embodiments of the present invention, which comprises storing data provided by a source to a storage region of a memory, which comprises a plurality of storage regions which store data, a basic information region which stores basic information regarding the data, and a plurality of supplemental information regions which periodically store supplemental information as the supplemental information is updated according to the storing of the data, and periodically updating the supplemental information region corresponding to the storage region to which the data is currently stored, with the supplemental information regarding the data being stored.

The periodically updating comprises: storing the current data to a first storage region to which the data is currently stored, periodically updating the supplemental information region which corresponds to the first storage region, with the supplemental information regarding the data being currently stored, if the first storage region does not have a residual space further storing, continuing storing the data to a second storage region as the next storage region, and periodically updating the supplemental information region which corresponds to the second storage region, with the supplemental information regarding the data being stored to the second storage region.

If the data provided by the signal source is a transfer stream, additional operations may be provided, including dividing the transfer stream into audio and video data, decoding the divided video data, and determining picture characteristic per frame of the decoded video data, wherein the storing the supplemental information comprises storing the determined picture characteristic per frame as the supplemental information.

The determining comprises determining the picture characteristic per frame of the decoded video data, and periodically updating comprises updating the supplemental information region which corresponds to the storage region to which the decoded video data is stored, with the determined picture characteristic per frame.

The foregoing and other aspects are substantially realized by providing an image device, according to exemplary embodiments of the present invention, which comprises a storage unit for storing compressed pictures of a moving image; and a control unit for extracting at least one of the compressed pictures, which corresponds to a scene selected from the moving image being displayed, from the storage unit. The method for storing is incorporated in a television broadcast receiver having a memory.

The television broadcast receiver is a DVR or a PVR.

The storage of the data occurs during the time shift recording of the television broadcast.

The storage of the data occurs during a reserved recording of the television broadcast.

BRIEF DESCRIPTION OF THE DRAWINGS

The above and other aspects of the present invention will become more apparent and more readily appreciated from the following description of the exemplary embodiments, taken in conjunction with the accompany drawings of which.

Throughout the drawings, like reference numerals will be understood to refer to like parts, components and structures.

DETAILED DESCRIPTION OF EXEMPLARY EMBODIMENTS

Exemplary embodiments of the present invention will now be described in detail with reference to the annexed drawings. In the drawings, the same elements are denoted by the same reference numerals throughout the drawings. In the following description, detailed descriptions of known functions and configurations incorporated herein have been omitted for conciseness and clarity.

Figure 1:
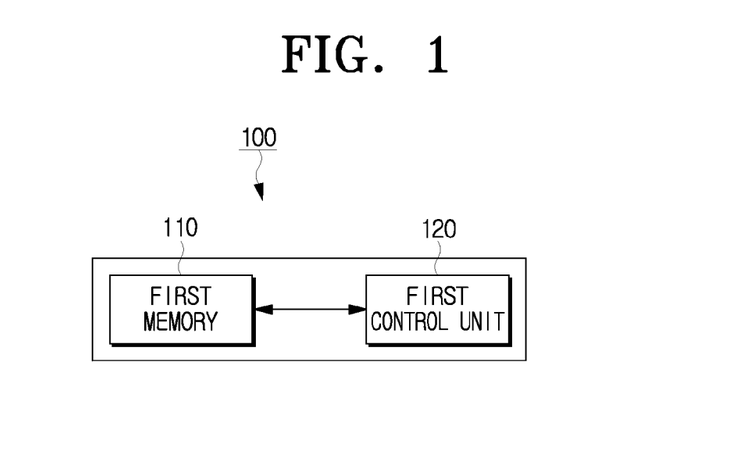
FIG. 1 is a block diagram of a first digital electronic device capable of formatting a memory, according to a first exemplary embodiment of the present invention.

FIG. 1 is a block diagram of a first digital electronic device capable of formatting a memory, according to a first exemplary embodiment of the present invention.

Referring to FIG. 1, the first digital electronic device 100 according to an exemplary embodiment of the present invention includes a first memory 110 and a first control unit 120. The first digital electronic device 100 is capable of formatting a memory for storing data, and may be implemented as a digital recording and reproducing apparatus such as a Personal Video Recorder (PVR), or a Digital Video Recorder (DVR).

The first memory 110 stores data. The first memory 110 may be implemented as a NAND Flash memory, a NOR Flash memory, or HDD. The first memory 110 may be implemented as a memory built in the first digital electronic device 100, or a removable memory which is connectible through a communication interface.

The first control unit 120 formats the first memory 110 such that the first memory 110 is divided into first through (n)th storage regions, basic information regions, that is, basic file allocation table (FAT), and first through (n)th supplemental information regions, that is, first through (n)th supplemental FAT.

Figure 2A:
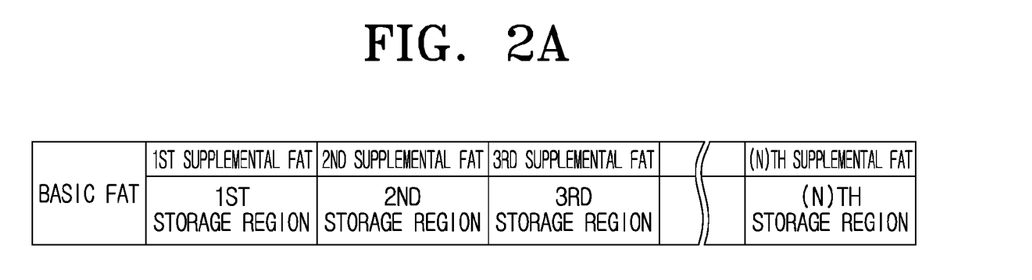
FIG. 2A schematically illustrates the structure of a first format of a first memory which is formatted by the first control unit of FIG. 1.
Figure 2B:
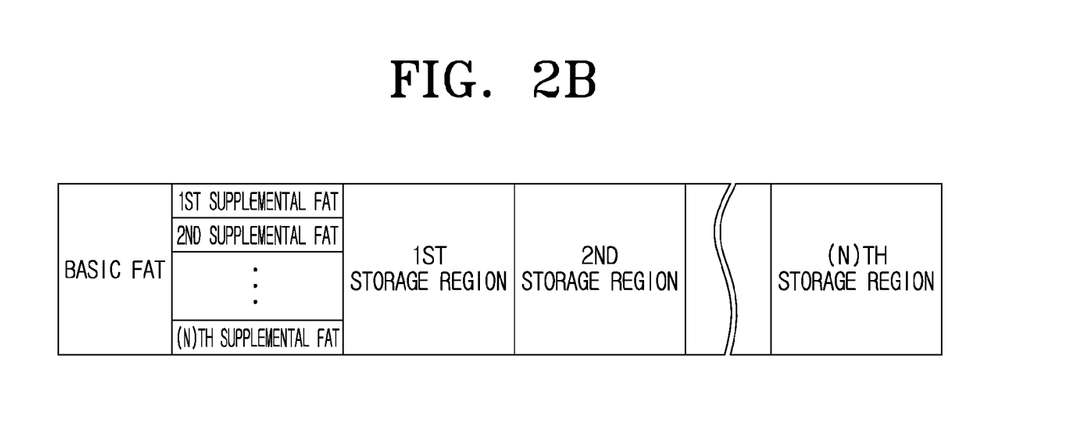
FIG. 2B schematically illustrates the structure of a second forma of a first memory which is formatted by the first control unit of FIG. 1.

FIG. 2A schematically illustrates the structure of a first format of a first memory which is formatted by the first control unit of FIG. 1, and FIG. 2B schematically illustrates the structure of a second forma of a first memory which is formatted by the first control unit of FIG. 1.

Referring to FIGS. 2A and 2B, the first through (n)th storage regions store data being input from a signal source (S), the basic FAT stores basic information regarding the data being stored, and the first through (n)th supplemental FAT stores supplemental information being updated when the data is stored to the respective storage regions.

FIG. 2A illustrates the result of formatting the first memory 110 in a manner such that, if the first memory 110 is the type of storage medium that has a plurality of sectors, the first supplemental FAT and the first storage region corresponding to the first supplemental FAT are placed in the same sector, that is, in the first sector, and the (n)th supplemental FAT and the (n)th storage region corresponding to the second supplemental FAT are placed in the (n)th sector.

FIG. 2B illustrates the result of formatting the first memory 110 in a manner such that the first through (n)th supplemental FAT are placed in the same sector.

The basic information may include data attributes, date of storage, or title of storage. The supplemental information may include, if the video data is being stored, picture information per frame of the video data, and/or time information at which each picture is located. The picture information per frame of the video data, and time information at which each picture is located, are updated according to a preset period, under the control of the first control unit 120, while the video data is being stored to the storage regions.

The first control unit 120 controls the first memory 110 to store in the basic FAT, the location information of the respective storage regions and the location information of the supplemental FAT of the first memory 110. The first control unit 120 may cause the first memory 110 to be formatted to allocate one supplemental FAT for each of the storage regions, and the location information of the supplemental FAT allocated to each of the storage regions is mapped with the location information of the storage regions allocated with the supplemental FAT, and stored in the basic FAT. Accordingly, by recording data to the first memory 110 formatted as explained above, it is clear that which of the supplemental information for the data reproducing is stored in which of the supplemental information regions, when the data is reproduced from the first memory 110. A supplemental FAT may be mapped to a plurality of storage regions and conversely, a plurality of supplemental FAT may be mapped to a storage region.

Figure 3:
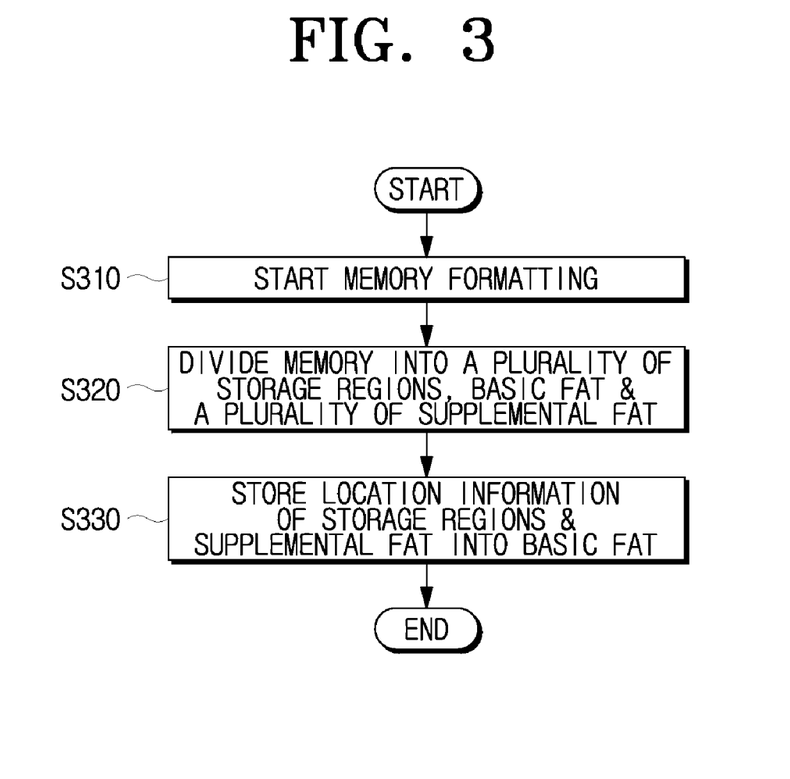
FIG. 3 is a flowchart illustrating a method of formatting a memory by FIG. 1.

FIG. 3 is a flowchart illustrating a method of formatting a memory by FIG. 1.

Referring to FIGS. 1 through 3, the formatting of the first memory 110 starts (S310). Accordingly, the first control unit 120 causes the first memory 110 to be divided into first through (n)th storage regions to store data, basic FAT to store basic information regarding the data, and first through (n)th supplemental FAT to store supplemental information which is periodically updated according to the data storage (S320).

Each of the first through (n)th storage regions is allocated with each of the supplemental FAT at operation S320. The number of the first through (n)th supplemental FAT, being divided at operation S320, may be equal to, or greater than the number of the first through (n)th storage regions.

The first control unit 120 controls the first memory 110 to store the location information of the respective storage regions, being divided at operation S320, in the first memory 110, and the location information of the respective supplemental FAT in the first memory 110, in the basic FAT. That is, the first control unit 120 controls the first memory 110 to store address information in the basic FAT (S330). In one desirable example, the first control unit 120 may map the location information of the supplemental FAT allocated to the respective storage regions at operation S320, with the location information of the storage regions to which the supplemental FAT is allocated, and store the mapped information.

If the first memory 110 is formatted according to the above exemplary embodiment of the present invention, the supplemental information, which is periodically varied, is not stored to a single supplemental FAT only (for example, first supplemental FAT), but distributed to a plurality of supplemental FAT, when the data is stored to the first memory 110. As a result, the span of the first memory 110 to store the supplemental information is extended according to the number of the supplemental FAT.

Figure 4:
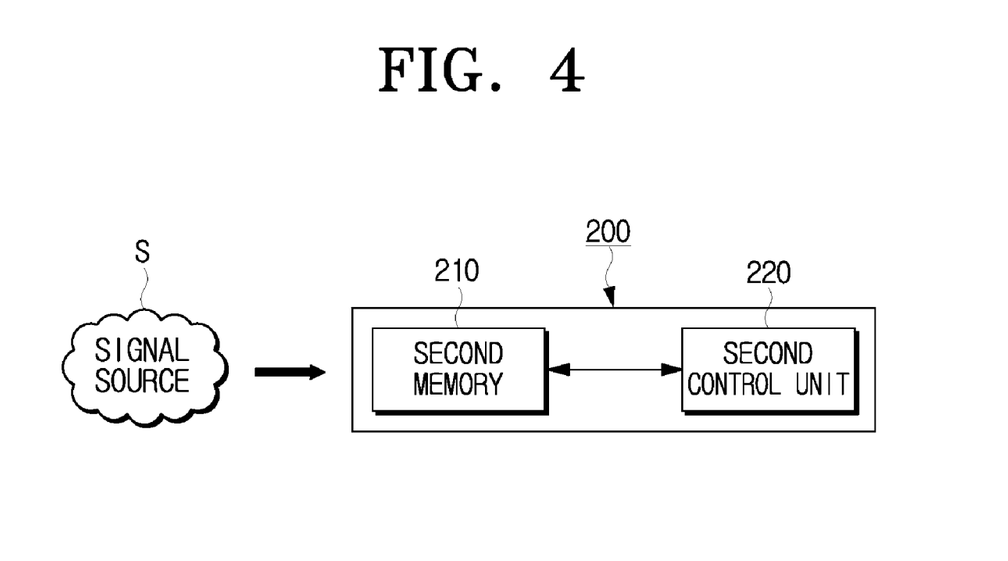
FIG. 4 is a block diagram of a second digital electronic device having a function of storing, according to a second exemplary embodiment of the present invention.

FIG. 4 is a block diagram of a second digital electronic device having a function of storing, according to a second exemplary embodiment of the present invention.

Referring to FIG. 4, the second digital electronic device 200 according to the second exemplary embodiment of the present invention includes a second memory 210 and a second control unit 220. The second digital electronic device 200 stores data into a memory which is formatted according to the method explained above with reference to FIGS. 2A and 2B, and may be implemented as a PVR, DVR, or the like.

The second memory 210 stores the data provided from a signal source (S). The signal source (S) refers to any type of sources that can transmit the stored data to the second digital electronic device 200, and may include satellite broadcast station, terrestrial broadcast station, external storage medium, or personal computer.

The second memory 210 may use high capacity storage medium, such as NAND Flash memory, NOR Flash memory, or HDD. The second memory 210 may include at least one of a built-in memory, or a removable memory connected to the second digital electronic device 200 via communication interface.

Referring back to FIGS. 2A and 2B, the second memory 210 is formatted such that it includes a plurality of storage regions to store data, basic FAT to store basic information regarding the data, and a plurality of supplemental FAT to which supplemental information, which is updated whenever the data is stored, is distributed and stored.

If data is provided from the signal source (S), the second control unit 220 stores the data into a plurality of storage regions in sequence, and controls the second memory 210 such that the supplemental information of the supplemental information region corresponding to the storage region, among the plurality of storage regions, to which the data is currently stored, is periodically updated.

If the data is currently being stored to the first storage region, for example, the second control unit 220 controls the second memory 210 to store the supplemental information regarding the currently-stored data into the first supplemental FAT which corresponds to the first storage region. If the first storage region is full, the second control unit 220 controls the second memory 210 to store the data to the second storage region, and store the supplemental information stored to the last part of the first supplemental FAT to the second supplemental FAT which corresponds to the second storage region. By doing as above, updating only one supplemental FAT, for example, updating only the first supplemental FAT periodically during the storage of the data to first and second storage regions, can be prevented.

Figure 5:
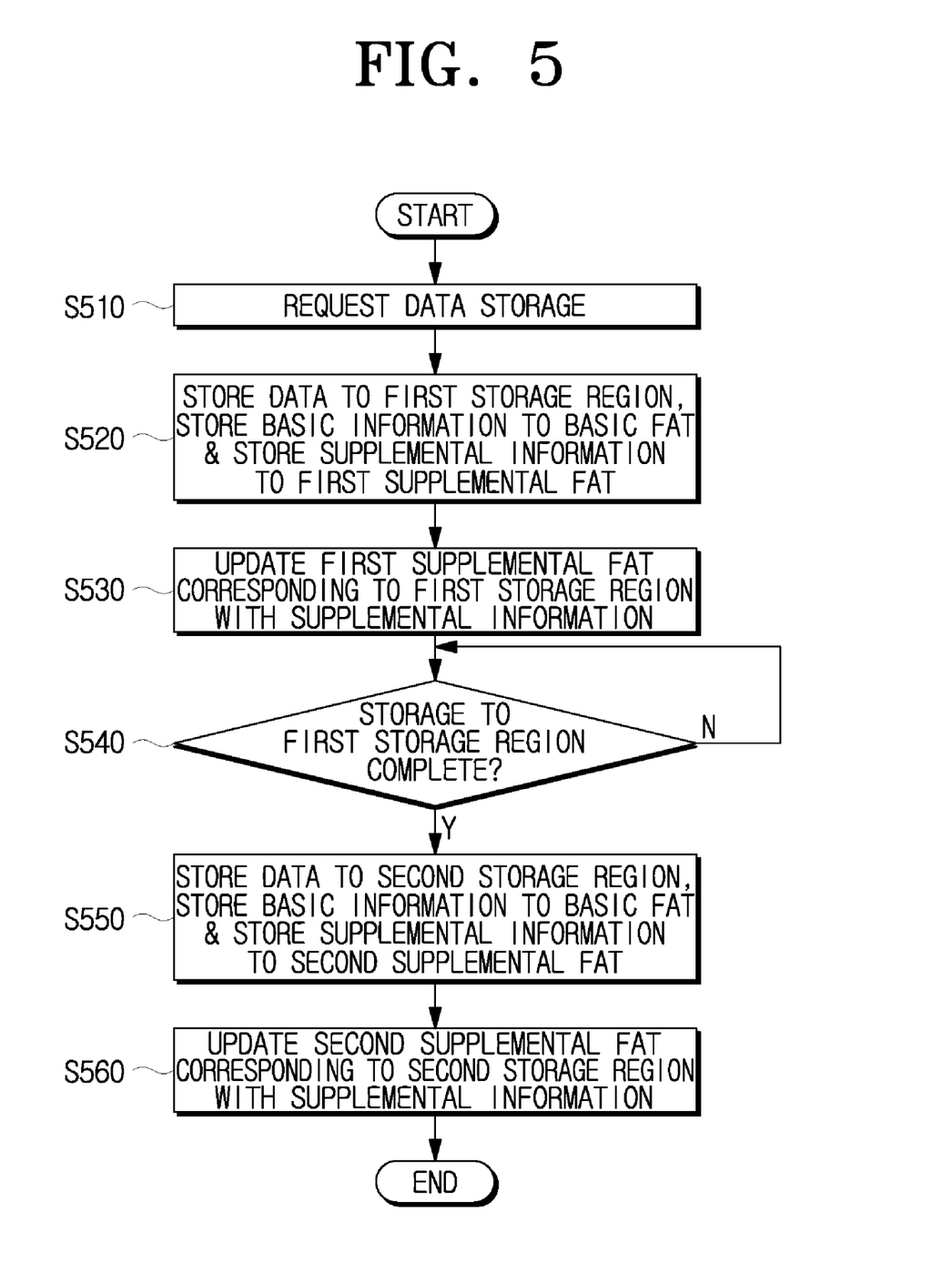
FIG. 5 is a flowchart illustrating a method of storing data by FIG. 4.

FIG. 5 is a flowchart illustrating a method of storing data by FIG. 4.

Referring to FIGS. 4 and 5, a request for storing data from a signal source (S) is received (S510), and the second control unit 220 controls the second memory 210 to store the data to one of the first through (n)th storage regions of the second memory 210, for example, to the first storage region, to store the basic information of the data to the basic FAT, and to store the supplemental information, which is updated according to the storage of the data into the first storage region, into the first supplemental FAT corresponding to the first storage region (S520).

The second control unit 220 controls the second memory 210 to periodically update the supplemental information regarding the currently stored data, in the first supplemental FAT which corresponds to the first storage region to which the data is currently being stored (S530).

If there is no more residual space storage in the first storage region (S540), the second control unit 220 controls the second memory 210 to store the data to the next storage region, that is, to the second storage region, and to store the supplemental information of the first supplemental FAT to the second supplemental FAT which corresponds to the second storage region (S550).

The second control unit 220 controls the second memory 210 to periodically update the supplemental information stored in the second supplemental FAT, in relation to the data being stored to the second storage region (S560). The above controlling continues until the storage of data is completed.

According to the second exemplary embodiment of the present invention, while the data is stored to the second memory 210, the supplemental information, which is periodically varied according to the data storage, is stored to the first through (n)th supplemental FAT in sequence, instead of being repeatedly stored to a single supplemental FAT, for example, to the first supplemental FAT. As a result, the span of storing the supplemental information to the second memory 210 according to the storage of the data, can be extended in proportion to the number of supplemental FAT.

Figure 6:
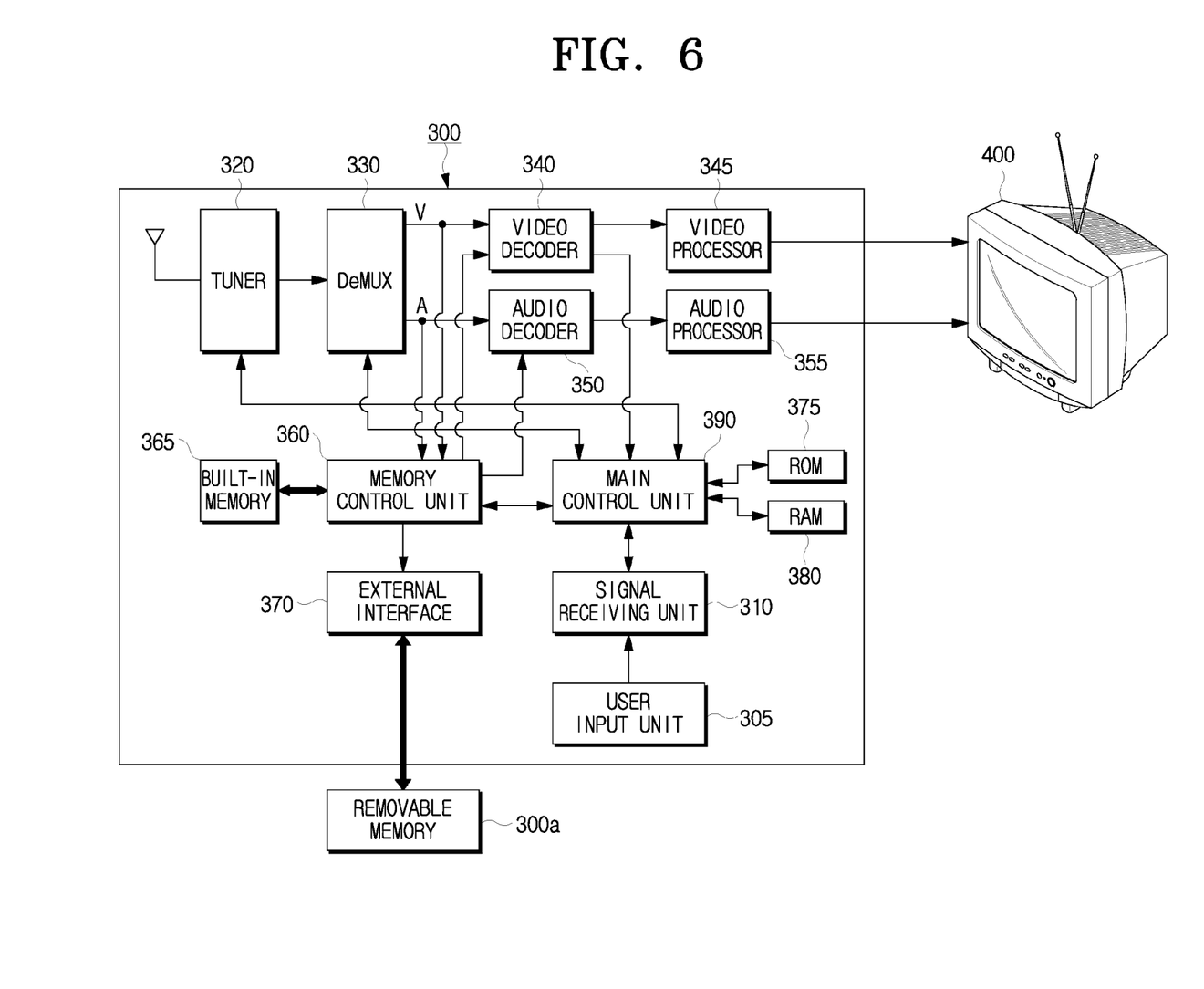
FIG. 6 schematically illustrates a third digital electronic device having a function of storing, according to a third exemplary embodiment of the present invention.

FIG. 6 schematically illustrates a third digital electronic device having a function of storing, according to a third exemplary embodiment of the present invention.

Referring to FIG. 6, a third digital electronic device 300 according to a third exemplary embodiment of the present invention includes a user input unit 305, a signal receiving unit 310, a tuner 320, a demultiplexer (DeMUX) 330, a video decoder 340, a video processor 345, an audio decoder 350, an audio processor 355, a memory controller 360, a built-in memory 365, an external interface 370, a ROM 375, a RAM 380, and a main control unit 390.

The third digital electronic device 300 illustrated in FIG. 6 stores audio/video data to the built-in memory or a removable memory, based on the motion picture compression technology such as Motion Pictures Experts Group (MPEG), and interfaces with the TV. The third digital electronic device 300 may be built in the TV, or provided in a removable manner from the TV.

The third digital electronic device 300 formats the built-in and removable memories 365, 300a using a preset file system, when it is necessary to format the memories 365, 300a. Referring to FIGS. 2A and 2B, the built-in and removable memories 365, 300a may be formatted to include first through (n)th storage regions, a basic FAT, and first through (n)th supplemental FAT.

Formatting techniques regarding the built-in and removable memories 365, 300a are explained above with reference to FIGS. 1 through 3, and will not be explained below for the sake of brevity. The process of recording broadcast to the formatted built-in memory 365, while viewing the broadcast, will be explained below.

The user input unit 305 is a user interface which enables the user to request, set or alter the functions supported by the third digital electronic device 300. The user input unit 305 includes a plurality of buttons, numeric keys, direction keys, function keys, or short keys, and provided to a front of the main body of the third digital electronic device 300 for the user convenience.

The user manipulates the user input unit 305 to request formatting of the built-in memory 365 or the removable memory 300a, storage mode selection signal to request recording, or reproducing of the recorded broadcast. The user request may also be achieved by using a remote controller system, or wired or wireless mouse, which is programmed for communicating according to the communication standards.

The storage mode may include recording of current broadcast, reserved broadcast recording, or time shift recording. The 'time shift' recording is recording and reproducing function, which is used when the user presses a pause button while viewing a real time broadcast. That is, the time shift function enables a user to view broadcast from when he presses the pause button. In the time shift recording, the broadcast is stored to a built-in storage medium, or to a removable storage medium, from the time when a pause command is input. The recent development of the related technology has also enabled the time shift function from the beginning, such that it is now possible to store real time broadcast to the built-in memory 365 upon turning on of the third digital electronic device 300.

The signal receiving unit 310 receives a command according to the user manipulation through the user input unit 305, for example, the signal receiving unit 310 receives a recording request signal and outputs it to the main control unit 390.

The tuner 320 tunes to one of a plurality of channels received over an antenna, which is previously selected according to a tune control signal of the main control unit 390, and decodes the broadcast of the tuned channel, that is, decodes the transfer stream.

The DeMUX 330 divides the decoded transfer stream into video and audio data, and outputs the video data and the audio data to the video decoder 340 and the audio decoder 350, respectively.

The video decoder 340 decodes the video data received from the DeMUX 330 in a frame unit or a field unit, in response to a request for recording or reproducing received from the user input unit 305. If a request input through the user input unit 305 requests reproducing of the transfer stream stored in the removable memory 300a, the video decoder 340 decodes the video data output from the removable memory 300a. The video decoder 340 then outputs the decoded video data to the video processor 345 and the main control unit 390. The video decoder 340 decodes the video data according to a preset decoding method. For example, the video decoder 340 may support compression and decoding according to Motion Pictures Experts Group-2 (MPEG-2).

The video processor 345 enhances quality of the decoded video data, and converts, by scaling, the data into a viewable signal. The video data is output to a connected TV 400 and displayed thereon.

The audio decoder 350 decompresses, by decoding the audio data input from the DeMUX 330. The audio processor 355 processes the decoded audio data to audible signal, amplifies to a predetermined volume, and output through the TV 400. As a result, the amplified audio data is output through a speaker.

While the broadcast is stored to the built-in memory 365 or the removable memory 300a, the memory control unit 360 under the control of the main control unit 390 provides a passage, through which the audio and video data from the DeMUX 330 are output to the built-in memory 365, or to the removable memory 300a which is connected via the external interface 370.

The memory control unit 360 controls the built-in memory 365 or the removable memory 300a to store the audio data, video data and supplemental data into designated regions, in which the audio and video data are output to the storage region which is designated by the main control unit 390 from among the first through (n)th storage regions, and the supplemental information is output to the supplemental FAT which corresponds to the designated storage region. The memory control unit 360 may include an Advanced Technology Attachment (ATA) memory controller by ATA bus.

In order to reproduce a compression file from the built-in memory 365 or the removable memory 300a, the memory control unit 360 reads out the file from the built-in memory 365 or the removable memory 300a, and outputs the file to at least one of the video decoder 340 and the audio decoder 350.

The built-in memory 365 stores the broadcast received through the tuner 320, and motion pictures, still images and various types of data provided by the removable memory 300a. The user designates a directory and file name by manipulating the user input unit 305, and stores the broadcast or the motion picture signal into the built-in memory 365.

The built-in memory 365, after formatting, has the structure as shown in FIG. 2A or 2B. The built-in memory 365 may include a Flash memory such as NAND Flash memory, or NOR Flash memory, or HDD.

The removable interface 370 operates as an intermediate passage between at least one removable memory 300a and the memory control unit 360, and conducts data communication with the removable memory 300a. In response to a command to store the data to the removable memory 300a output from the user input unit 305, the removable interface 370 outputs the data provided by the memory control unit 360 to the connected removable memory 300a. In response to a request for reproducing of file from the removable memory 300a through the user input unit 305, the removable interface 370 outputs the data of the target file being output from the removable memory 300a, to the memory control unit 360.

The external interface 370 may be connected to the removable memory 300a such as HDD, via a Universal Serial Bus (USB) standard, or IEEE 1394 standard, or may be connected to the removable memory 300a such as a Flash memory. If the external interface 370 is provided with a plurality of physical interfaces, the number of the applicable communication standards, or the number of removable memories 300a, are not limited, and the removable memory 300a, after formatting, has the structure as illustrated in FIG. 2A or 2B.

The ROM 375 stores the control programs to achieve the functions of the third digital electronic device 300 such as booting program or system terminating program, and also stores format programs to format the built-in memory 365 and the removal memory 300a.

The RAM 380 temporarily stores the data processed by the main control unit 390, and the decoded video data output from the video decoder 340.

The main control unit 390 controls the operation according to the exemplary embodiments of the present invention, and the operation of the third digital electronic device 300 to conform to the request of the user input through the signal receiving unit 310, by using the control programs and the format programs stored in the ROM 375.

When the third digital electronic device 300 is turned on, the main control unit 390 executes the booting program to boot the third digital electronic device 300, and to initialize the built-in memory 365 and the removable memory 300a. In the initialization, the main control unit 390 determines whether the built-in memory 365 and the removable memory 300a are formatted. If it is determined that the built-in memory 365 or the removable memory 300a has to be formatted, the main control unit 390 formats the built-in memory 365 or the removable memory 300a according to the operations explained above with reference to FIGS. 1 through 3.

The main control unit 390 may determine whether the memories 365, 300a are formatted, by checking the basic FAT which is allocated to a specific address of the built-in memory 365 and the removable memory 300a. For example, if the built-in memory 365 does not have a basic FAT allocated to a specific address, and if the removable memory 300a has a basic FAT, the main control unit 390 determines that the built-in memory 365 needs formatting, and therefore formats the built-in memory 365 into the structure as illustrated in FIG. 2A or FIG. 2B.

The main control unit 390 may also format the built-in memory 365 and the removable memory 300a according to the operations explained above with reference to FIGS. 1 through 3, in response to a request for a re-formatting of the memories 365, 300a which is received through the user input unit 305.

When the third digital electronic device 300 completes booting, a broadcast of a specific channel is reproduced. If a request for storing the currently-reproduced broadcast to the built-in memory 365 is received through the user input unit 305, the main control unit 390 controls the DeMUX 330 to output the divided video and audio data to the memory control unit 360.

In particular, the main control unit 390 controls the memory control unit 360 to store the broadcast to first through (n)th storage regions in sequence, to periodically update the supplemental information regarding the currently-stored broadcast, of the supplemental FAT corresponding to the storage region to which the broadcast is currently stored, and to store the basic information of the broadcast into the basic FAT.

That is, the main control unit 390 controls the memory control unit 360 such that, if a storage region to store the video and audio data is determined, the determined storage region of the built-in memory 365 is provided with the video and audio data input from the DeMUX 330, and the basic information is provided to the basic FAT.

The basic information of the broadcast may include a file name input through the user input unit 305, or a program title of the broadcast, included in the decoded result, or the volume of the entire broadcast.

The supplemental information of the broadcast may be checked based on the decoding result of the video decoder 340. If a decoding result is input from the video decoder 340 in frame, or field unit, the main control unit 390 checks from the decoding result the information such as the basic information of the broadcast, picture information per frame, time information at which each picture is located, and volume of the broadcast, and temporarily stores the confirmed information in the volatile memory such as the RAM 380. The main control unit 390 then causes the supplemental information of the volatile memory such as the RAM 380 to be output to the memory control unit 360 and updated into the built-in memory 365 according to a preset period.

The picture information per frame may include I-picture, B-picture or P-picture. The I-picture refers to an intra frame picture, and is compressible and recoverable, regardless of the other frames. The P-picture refers to a predicted frame picture, which is predictable from the previous frame. The B-picture refers to a bi-directional frame picture, which is interpolated from the previous, or the following frame.

For example, if the built-in memory 365 is used for the first time since the formatting, the main control unit 390 may determine the first storage region to start storing the broadcast, and check the basic information of the broadcast to be stored, based on the decoding result output from the video decoder 340.

The main control unit 390 controls the memory control unit 360 to output the video and audio data to the first storage region of the built-in memory 365, and output the confirmed basic information to the basic FAT. Additionally, the main control unit 390 controls the memory control unit 360 such that, if the current frame is determined to be the I-picture according to the decoding result of the frame, and if the current time of recording is confirmed with reference to the time of starting the recording, in consideration of the fact that the current broadcast is being stored in the first storage region, the confirmed supplemental information is stored to the first supplemental FAT which is mapped with respect to the first storage region.

If the first storage region does not have any residual space storage, the main control unit 390 controls the memory control unit 360 such that the last supplemental information stored in the first supplemental FAT is stored to the second supplemental FAT which corresponds to the second storage region.

As a result, the memory control unit 360 controls the built-in memory 365 to output the broadcast to the second storage region, and to store the supplemental information including the final update result of the first supplemental FAT, to the second supplemental FAT. The memory control unit 360 then processes such that the supplemental information acquired from the decoding result is updated periodically, with respect to the second supplemental FAT. This controlling continues until the storage of the broadcast is completed.

As explained above, whenever the storage region to store the data is changed, the supplemental information regarding the broadcast is shifted and stored to a supplemental FAT which corresponds to the changed storage region such that the capacity to update the supplemental information of the built-in memory 365 or the removable memory 300a is extended.

Meanwhile, if one-hour long broadcast is stored from the first to third storage regions, it means that the broadcast is stored to the first through third storage regions in sequence. Therefore, the fourth storage region is the one to be used first in the next recording, such as reserved recording or time shift recording, and the third storage region is the one to be use last. That is, the next recording will use the fourth storage region, the (n)th storage region, and then the first through third storage regions.

Accordingly, the main control unit 390 controls the memory control unit 360 to store the fourth supplemental FAT which corresponds to the fourth storage region, and the third supplemental FAT which corresponds to the third storage region, to the basic FAT, so that the first and the last storage regions to use in the next recording can be stored. If a request for recording of different broadcast is received after a time interval, the main control unit 390 checks the basic FAT to determine which storage regions are available. If it is determined that the storage regions are available from the fourth storage region, the main control unit 390 controls the memory control unit 360 to output the broadcast to the fourth storage region, and to output the supplemental information to the fourth supplemental FAT.

If one-hour long broadcast is stored from first to third storage regions, the supplemental information regarding the broadcast is stored in the third supplemental FAT. Accordingly, in reproducing the stored broadcast, the main control unit 390 causes the broadcast of the first through third storage regions to be reproduced, using the supplemental information and the basic information stored in the third supplemental FAT and the basic FAT. Because the third supplemental FAT includes the supplemental information stored in the first and second supplemental FAT, the supplemental information of the first and second supplemental FAT may not be used.

Figure 7:
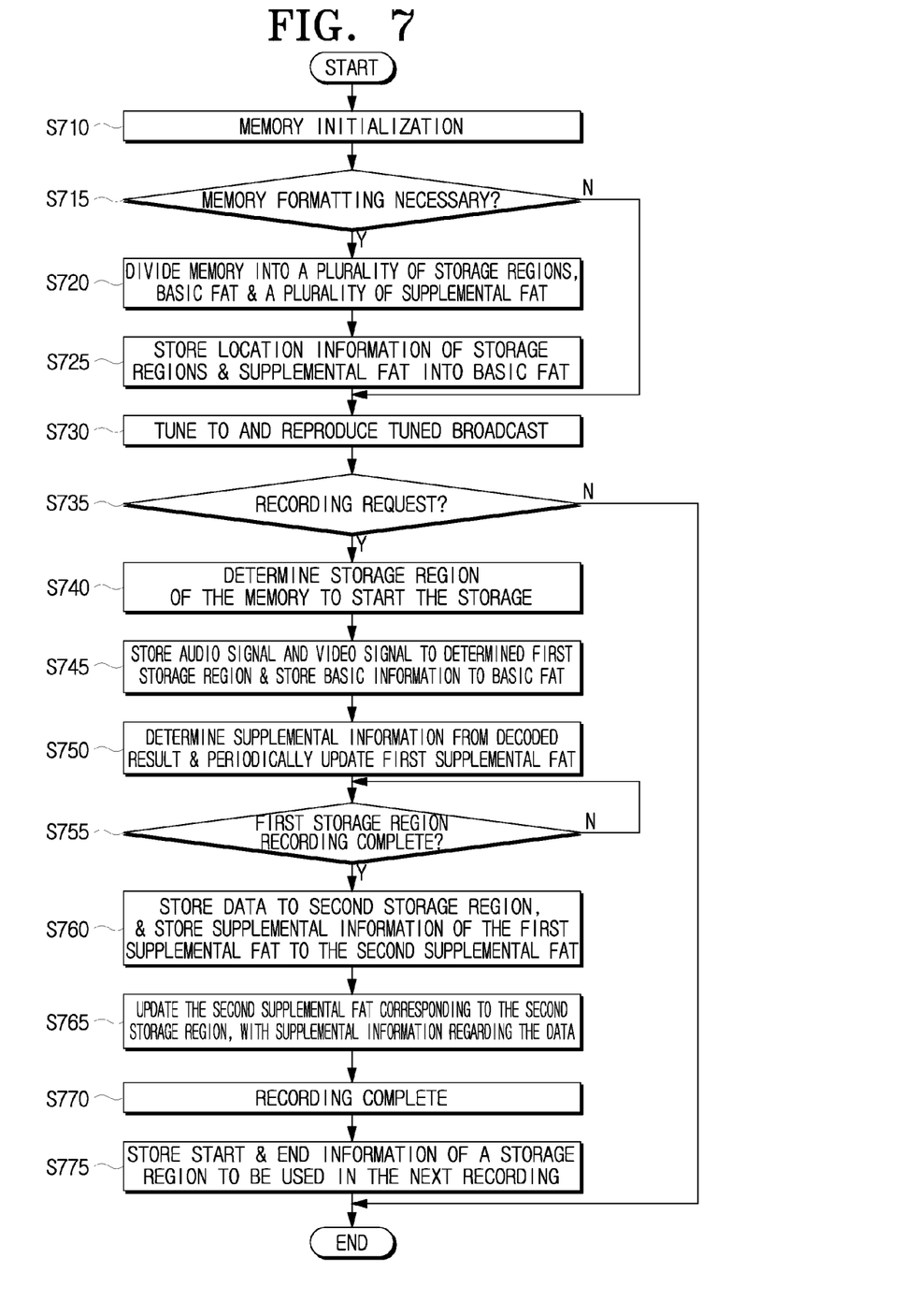
FIG. 7 is a flowchart illustrating a method of storing data by FIG. 6.

FIG. 7 is a flowchart illustrating a method of storing data by FIG. 6.

Referring to FIGS. 6 and 7, upon turning on, the main control unit 390 initializes the connected memories, that is, the built-in memory 365 and the removal memory 300a (S710). If it is determined during the initialization that at least one of the memories, for example, the built-in memory 365 needs formatting (S715), the main control unit 390 formats the built-in memory 365 in a manner such that the built-in memory 365 is divided into first through (n)th storage regions, the basic FAT, and the first through (n)th supplemental FAT (S720).

After operation S720, the main control unit 390 outputs a control signal to the memory control unit 360, thereby directing the memory control unit 360 to store the address information of the respective storage regions divided at operation S720, and the address information of the respective supplemental FAT, into the basic FAT (S730). Accordingly, the memory control unit 360 controls the built-in memory 365 to store the location information to the basic FAT according to the control of the main control unit 390. Desirably, the built-in memory 365 may be controlled such that the location information of the supplemental FAT allocated to the respective storage regions, is mapped with respect to the location information of the storage regions to which the supplemental FAT are allocated, and stored.

If the formatting of the built-in memory 365 is completed, the main control unit 390 controls the tuner 320, the DeMUX 330, the video decoder 340, the video processor 345, the audio decoder 350 and the audio processor 355, to tune to one of the channels, and process the tuned broadcast into reproducible signal (S730).

While the broadcast of the tuned channel is reproduced at operation S730, if a request for recording to the built-in memory 365 is received (S735), the main control unit 390 determines the storage regions among the first through (n)th storage regions of the built-in memory 365 to start the storage (S740). The request for recording may be input according to a previous reservation, or automatic time shift function which is executed upon turning on, or manually by a user.

If it is determined that the first storage region can start the storage, the main control unit 390 controls the memory control unit 360 to store the audio and video data divided from the broadcast into the first storage region, and to store the basic information of the broadcast into the basic FAT (S745). Accordingly, the memory control unit 360 causes the audio and video data to be output to the first storage region of the built-in memory 365, and the basic information to be output to the basic FAT.

If the decoding result if input from the video decoder 340, the main control unit 390 controls the memory control unit 360 to check the supplemental information of the respective frames, such as picture characteristics, time information at which each picture is located, or volume of the picture, and to store the confirmed supplemental information to the RAM 380, and to update the first supplemental FAT with the supplemental information which is confirmed in every preset period (S750).

If the first storage region does not have a residual space storage (S755), the main control unit 390 controls the memory control unit 360 to store the data to the next storage region, that is, to the second storage region, and to store the supplemental information of the first supplemental FAT to the second supplemental FAT which corresponds to the second storage region (S760).

The main control unit 390 controls the memory control unit 360 to periodically update the second supplemental FAT with the supplemental information regarding the data currently stored to the second storage region (S765).

If recording of a desired broadcast is completed (S770), the main control unit 390 checks the starting time and ending time of the storage region to be used in the next recording, and controls the memory control unit 360 to store the confirmed starting time and ending time information to the basic FAT (S775). For example, if the broadcast recording stops at the second storage region at operation S770, the main control unit 390 determines that the address of the third supplemental FAT, which corresponds to the third storage region, is the starting information to be used in the next recording such as time shift recording, and also determines that the address of the second supplemental FAT, which corresponds to the second storage region, is the ending information. Therefore, the next recording will use from the third storage region, and continue to the (n)th storage region until the second storage region.

With the digital electronic device capable of memory formatting, a method for memory formatting, and a digital electronic device having a storage function and a storage method thereof according to the exemplary embodiments of the present invention, the memory is formatted such that a plurality of relatively more-frequently used regions are provided. By distributing the supplemental information regarding the data into the plurality of regions of the formatted memory, lifespan of the memory and the device can be extended.

In particular, if transfer stream is stored, by distributing the periodically-updated supplemental information about the transfer stream into a plurality of supplemental regions, lifespan of storage parts of the AV products, can be improved.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A digital electronic device capable of memory formatting, comprising:
   a memory which stores data; and
   a control unit which formats the memory such that the memory includes a plurality of storage regions which store the data, a basic information region which stores basic information regarding the data, and a plurality of supplemental information regions which periodically store supplemental information updated according to the storing of the data,
   wherein the basic information region is a single sector which is separate from the plurality of storage regions and the plurality of supplemental information regions.

2. The digital electronic device of claim 1, wherein in the memory formatting, the control unit stores location information of the respective storage regions and location information of the supplemental information regions to the basic information region.

3. The digital electronic device of claim 2, wherein the location information of the respective storage regions is mapped to the location information of the supplemental information regions and stored in the basic information region.

4. The digital electronic device of claim 1, wherein the control unit formats the memory such that one supplemental information region is allocated for each of the storage regions.

5. The digital electronic device of claim 4, wherein the control unit causes the location information of the supplemental information regions allocated for the respective storage regions to be mapped with respect to the location information of the storage regions to which the supplemental information regions are allocated, and stored in the basic information region.

6. The digital electronic device of claim 1, wherein the memory comprises one of a Flash memory, and a Hard Disk Drive (HDD), and comprises at least one of a removable memory, and a built-in memory which are connected to the digital device having a recording function.

7. A digital electronic device having a storing function, comprising:
   a memory comprising a plurality of storage regions which store data, a basic information region which stores basic information regarding the data, and a plurality of supplemental information regions which periodically store supplemental information as the supplemental information is updated according to the storing of the data; and
   a control unit which controls the memory such that the data provided by a signal source is stored to the storage regions in sequence, and the supplemental information region corresponding to the storage region to which the data is currently stored, is periodically updated with the supplemental information regarding the data being stored,
   wherein the control unit controls the memory such that, if a first storage region which currently stores the data does not have a residual space further storing, the data is stored to a second storage region, which is the next storage region to store the data, and the last supplemental information stored in the supplemental information region corresponding to the first storage region, is stored to the supplemental information region which corresponds to the second storage region.

8. The digital electronic device of claim 7, wherein the control unit controls the memory such that the supplemental information region corresponding to the second storage region is updated with the supplemental information regarding the data being stored to the second storage region.

9. The digital electronic device of claim 7, wherein, if the data provided by the signal source is a transfer stream, further comprising:
a separator which divides the transfer stream into audio and video data; and
a decoder which decodes the divided video data, and wherein
the control unit determines picture characteristic per frame of the decoded video data, and controls the memory to process the determined picture characteristic per frame such that the determined picture characteristic per frame is stored as the supplemental information.

10. The digital electronic device of claim 9, wherein the control unit determines the picture characteristic per frame of the decoded video data, and controls the memory such that the determined picture characteristic per frame is stored according to a preset period, to the supplemental information region which corresponds to the storage region to which the decoded video data is stored.

11. The digital electronic device of claim 7, wherein the memory comprises one of a Flash memory and a Hard Disk Drive (HDD).

12. The digital electronic device of claim 7, wherein the memory comprises at least one of a removable memory, and a built-in memory.

13. The digital electronic device of claim 7, further comprising a signal receiving unit which receives a storage mode selection signal to store the data, and wherein the signal receiving unit receives the storage mode selection signal from at least one of a remote control system, a key input unit provided to a main body, and a mouse.

14. A method for formatting a memory, comprising:
allocating the memory into basic information region, at least one supplemental information region and at least one storage region; and
storing basic information for accessing the supplemental information region and the data region in the basic information region,
wherein the basic information region is a single sector which is separate from the plurality of storage regions and the plurality of supplemental information regions.

15. The method of claim 14, further comprising storing location information of the respective storage regions and location information of the respective supplemental information regions into the basic information region.

16. The method of claim 14, wherein the allocating the memory comprises allocating one supplemental information region for each of the storage regions.

17. The method of claim 16, wherein the storing comprises mapping location information of the supplemental information regions allocated to the respective storage regions with respect to location information of the storage regions to which the supplemental information regions are allocated, and storing the mapped data into the basic storage region.

18. The method of claim 14, wherein the number of the supplemental information regions is identical to the number of the storage regions.

19. The method of claim 14, wherein the memory comprises one of a Flash memory, and a Hard Disk Drive (HDD), and comprises at least one of a removable memory, and a built-in memory, which are connected to a digital recording and reproducing device.

20. A method for storing, comprising:
storing data provided by a source to a storage region of a memory, which comprises a plurality of storage regions which store data, a basic information region which stores basic information regarding the data, and a plurality of supplemental information regions which periodically store supplemental information as the supplemental information is updated according to the storing of the data; and
periodically updating the supplemental information region corresponding to the storage region to which the data is currently stored, with the supplemental information regarding the data being stored,
wherein the periodically updating comprises:
storing the data to a first storage region to which the data is currently stored;
periodically updating the supplemental information region which corresponds to the first storage region, with the supplemental information regarding the data being currently stored;
if the first storage region does not have a residual space further storing, continuing storing the data to a second storage region as the next storage region; and
periodically updating the supplemental information region which corresponds to the second storage region, with the supplemental information regarding the data being stored to the second storage region.

21. The method of claim 20, if the data provided by the signal source is a transfer stream, further comprising:
dividing the transfer stream into audio and video data;
decoding the divided video data; and
determining picture characteristic per frame of the decoded video data, and
wherein the storing the supplemental information comprises storing the determined picture characteristic per frame as the supplemental information.

22. The method of claim 21, wherein the determining comprises determining the picture characteristic per frame of the decoded video data, and
periodically updating comprises updating the supplemental information region which corresponds to the storage region to which the decoded video data is stored, with the determined picture characteristic per frame.

23. The method of claim 20, wherein the memory comprises one of a Flash memory and a Hard Disk Drive (HDD).

24. The method of claim 20, wherein the memory comprises at least one of a removable memory, and a built-in memory.

25. The method of claim 20, wherein the method for storing is incorporated in a television broadcast receiver having a memory.

26. The method of claim 25, wherein the storage of the data occurs during the time shift recording of the television broadcast.

27. The method of claim 25, wherein the storage of the data occurs during a reserved recording of the television broadcast.

28. The method of claim 25, wherein the television broadcast receiver is a DVR or a PVR.

* * * * *